(12) United States Patent
Wang et al.

(10) Patent No.: US 7,859,456 B2
(45) Date of Patent: Dec. 28, 2010

(54) METHOD OF MIXED DATA ASSISTED AND NON DATA ASSISTED NAVIGATION SIGNAL ACQUISITION, TRACKING AND REACQUISITION

(75) Inventors: Chi-Shin Wang, Half Moon Bay, CA (US); Zongde Qiu, Shishi (CN); Zhike Jia, San Jose, CA (US)

(73) Assignee: Sirf Technology Holdings, Inc., San Jose, CA (US)

( * ) Notice: Subject to any disclaimer, the term of this patent is extended or adjusted under 35 U.S.C. 154(b) by 1074 days.

(21) Appl. No.: 11/548,204

(22) Filed: Oct. 10, 2006

(65) Prior Publication Data

US 2008/0084336 A1 Apr. 10, 2008

(51) Int. Cl.
 G01S 19/24 (2010.01)
 G01S 19/25 (2010.01)
 G01S 19/27 (2010.01)
(52) U.S. Cl. .......................... 342/357.63; 342/357.64; 342/357.66
(58) Field of Classification Search ............ 342/357.12, 342/357.15, 357.63, 357.64, 357.66
 See application file for complete search history.

(56) References Cited

U.S. PATENT DOCUMENTS

| 5,884,220 | A | 3/1999 | Farmer et al. |
| 6,121,923 | A * | 9/2000 | King .................... 342/357.12 |
| 6,252,545 | B1 | 6/2001 | Da |
| 6,611,756 | B1 | 8/2003 | Chen et al. |
| 6,775,802 | B2 | 8/2004 | Gaal |
| 6,788,249 | B1 | 9/2004 | Farmer et al. |
| 6,965,760 | B1 | 11/2005 | Chen |
| 2002/0165669 | A1 | 11/2002 | Pinto et al. |
| 2006/0114984 | A1 | 6/2006 | Gaal et al. |

OTHER PUBLICATIONS

S. Soliman et al., GPS receiver sensitivity enhancement in wireless applications, IEEE MTT-S Symposium on Technologies for Wireless Applications, p. 181-186, Feb 1999.*

* cited by examiner

*Primary Examiner*—Thomas H Tarcza
*Assistant Examiner*—Fred H Mull
(74) *Attorney, Agent, or Firm*—Mark J. Danielson; Pillsbury Winthrop Shaw Pittman LLP

(57) ABSTRACT

The present invention provides systems and methods for enabling a navigation signal receiver to perform both data assisted and non-data assisted integration to provide better integration during signal acquisition, reacquisition and tracking. In data assisted integration mode, a receiver uses known or predicted data bits to remove the modulated data bits of a received signal prior to integration. In non data assisted integration mode, when the data bits are not known or predictable, the receiver uses an optimal estimation or maximum likelihood algorithm to determine the polarities of the modulated data bits of the received signal. This may be done by determining which of various possible bit pattern yields the maximum integrated power. When the modulated data bits are not known or predictable over a limited range, the receiver carries out data assisted integration over the known or predictable data bits and additional non data assisted integration.

50 Claims, 3 Drawing Sheets

DA, NDA AND MIXED NDA INTEGRATION MODES

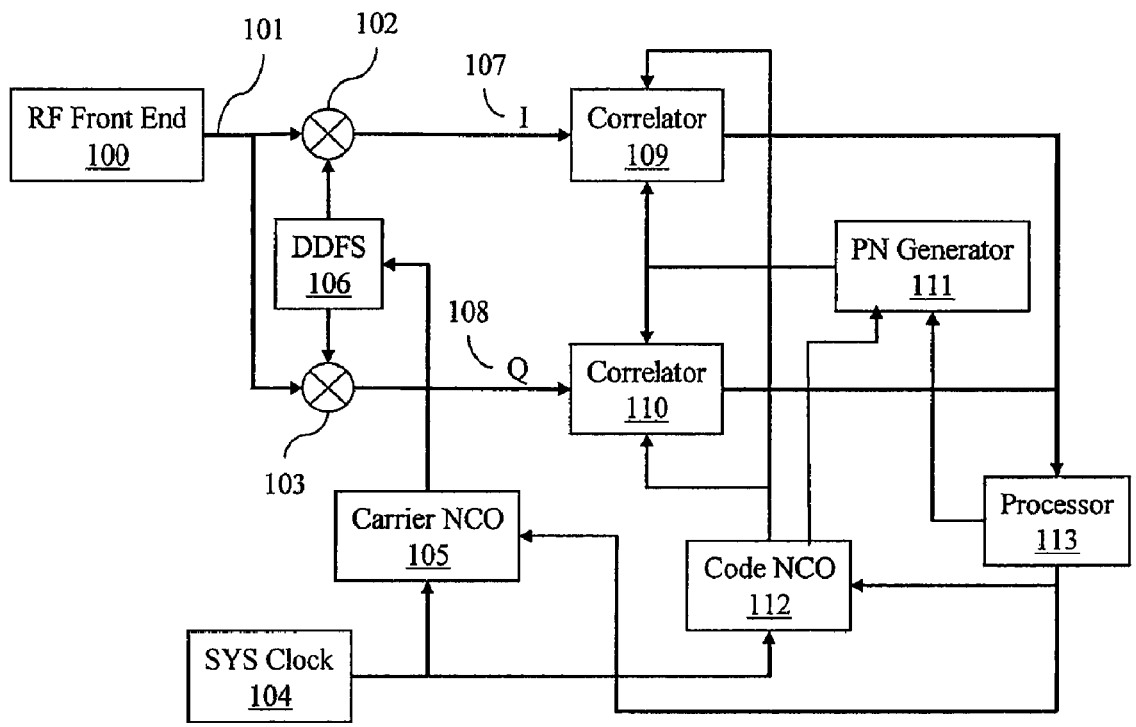
FIG. 1 A GPS baseband hardware

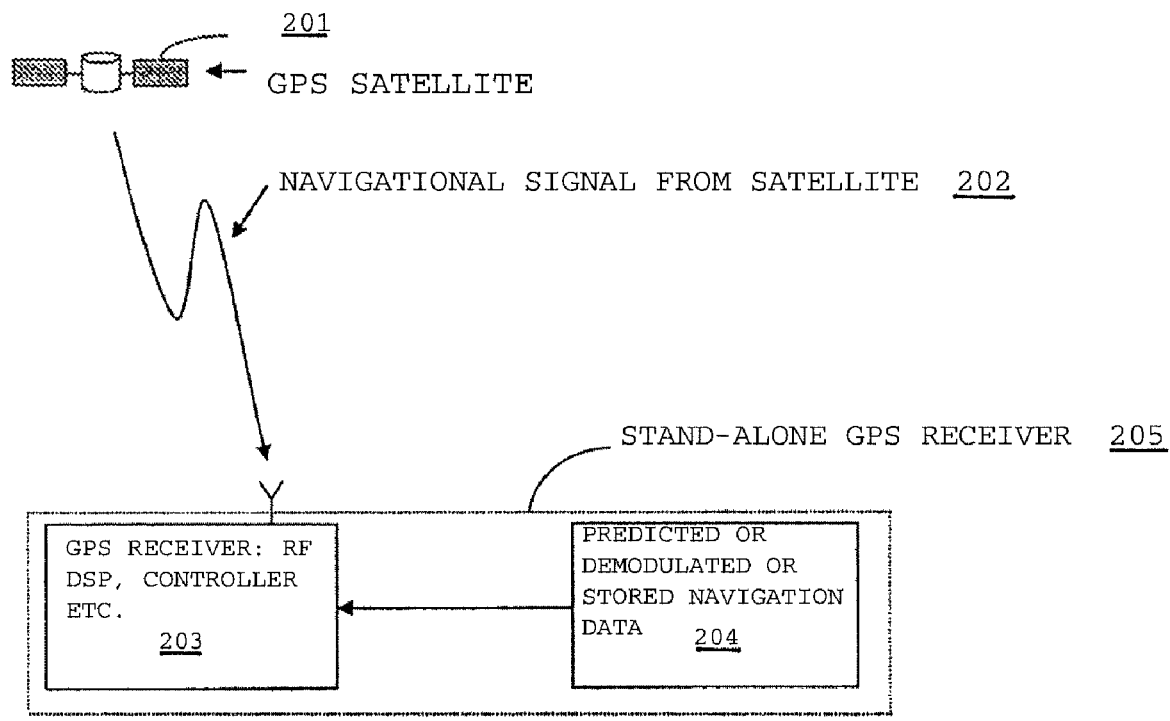
FIG 2. NAVIGATION RECEIVER SYSTEM

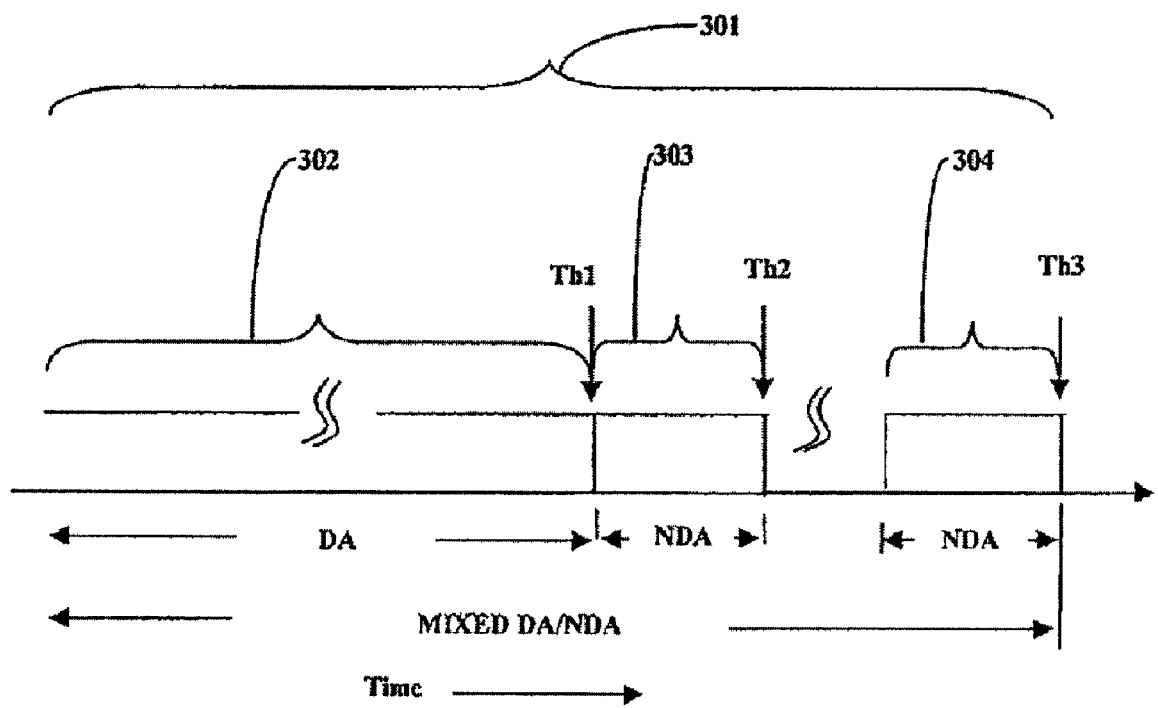
FIG. 3  DA, NDA AND MIXED NDA INTEGRATION MODES

METHOD OF MIXED DATA ASSISTED AND NON DATA ASSISTED NAVIGATION SIGNAL ACQUISITION, TRACKING AND REACQUISITION

FIELD OF THE INVENTION

The present invention relates generally to navigational signal receivers, and more particularly to systems and methods for weak navigation signal acquisition, tracking and reacquisition in data assisted mode and non-data assisted mode.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The power associated with noncoherent integration with one millisecond correlation is $$Power = \sum_{n=0}^{N-1} (I(n)^2 + Q(n)^2)$$

and the power associated with coherent integration is $$Power = \left(\sum_{n=0}^{N-1} I(n)\right)^2 + \left(\sum_{n=0}^{N-1} Q(n)\right)^2$$

where $I(n)$ and $Q(n)$ denote the in-phase and quadra-phase parts of one-millisecond correlation values from the baseband section at interval n, and N denotes the desired number of one-millisecond integration intervals.

The use of coherent integration is desired in weak signal acquisition, reacquisition and tracking. However, to achieve a long coherent integration two conditions need to be met. These conditions are that the residual frequency must be very small and the signal encoded data bits must be wiped off if the integration time is beyond the navigation data bit interval. Usually the residual frequency is made small by employing a large number of frequency bins. On the other hand once the integration period is more than 20 msec, which is the duration of a navigation data bit, the modulated data need to be removed from the signal before coherent integration. A prior knowledge of the data bits is needed for this purpose and this may be based upon the structure of the navigation message. A brief explanation on the structure of the message which may help in predicting the data is given below.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is known as TLM (Telemetry) word and the first eight bits of this TLM word are preamble bits and are always the same and used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0' s. These two '0' s help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The super frame contains twenty five consecutive frames, The contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

Thus from the above information it is possible to predict some of the navigation data bits and use the data prediction to wipe off the modulated navigation data from the received signal. The data prediction can be done easily for most of the data bits, which remain unchanged over a length of time. The ephemeris for example remains the same over a time length of two hours. The almanac remains the same for several days. The synchronizing word in TLM never changes. These facts may be used to predict the data and wipe off the same from the received signal thus ensuring a long coherent integration extending over several data bits. There are some patents in which the data bits are predicted to carry out a long integration. Published US patent application 2002/0049536 assigned to Qualcomm performs data wipe off by predicting the HOW word. This prediction is done by changing the TOW value as required and the associated parity. U.S. Pat. No. 6,611,756 assigned to Lucent similarly predicts not only the HOW word but also the TLM word and other data bits. U.S. Pat. No. 6,252,545 assigned to LUCENT discloses methods of long integration to acquire and track weak signals while U.S. Pat. No. 6,965,760 teaches a dynamic integration technique based on the received signal strength. However, under some conditions it may not possible to determine the data bits and therefore a complete data assisted integration is not possible.

Therefore, there is a need for systems and methods for enabling a navigation signal receiver to perform both data assisted and non-data assisted integration to provide better integration during signal acquisition, reacquisition and tracking.

SUMMARY

Accordingly, the present invention provides systems and methods for enabling a navigation signal receiver to perform both data assisted and non-data assisted integration to provide better integration during signal acquisition, reacquisition and tracking.

In an embodiment, a receiver predicts the modulated data bits of a received signal when the data bits are predictable. The receiver uses known or predicted data bits to remove the modulated data from the received signal prior to integration to reduce computation cost. In this case, the integration is data assisted. On the other hand, the receiver uses an optimal estimation or maximum likelihood algorithm to determine the polarities of the modulated data bits of the received signal when the data bits are not known or predictable. This may be done by determining which bit pattern yields the maximum integrated power from various possible bit patterns. In this case, the integration is non data assisted. When the modulated data bits are not known or predictable over a limited range, the receiver carries out data assisted integration over the known or predictable data bits and additional non data assisted integration beyond the known or predictable data bits.

The data bits may be known or predicted based on the characteristics of the data. For the example of GPS, the same synchronization pattern and TLM word may be used, while the change in the HOW word can be predicted for each frame. The ephemeris only changes once in two hours while the almanac changes once in several days. Thus the same ephemeris and almanac may be used over periods of time. Further, even if the ephemeris is obsolete, most of its data bit remain unchanged and may therefore be used in integration extending over several data bits of a word. Under the condition in which no data bits can be reliably predicted, the integration simply switches to non data assisted mode.

The above and other advantages of embodiments of this invention will be apparent from the following more detailed description when taken in conjunction with the accompanying drawings.

BRIEF DESCRIPTION OF THE DRAWINGS

FIG. 1 is a block diagram illustrating a GPS receiver according to an embodiment of the present invention.

FIG. 2 illustrates a GPS navigation receiver system according to an embodiment of the present invention.

FIG. 3 illustrates data assisted (DA), non data assisted (NDA), and mixed DA/NDA integration modes according to an embodiment of the present invention.

DETAILED DESCRIPTION

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

For a coherent integration beyond a duration of 20 milliseconds the associated navigation data bits need to be known before hand. This data may be retrieved from memory where data that remains the same over a given period of time is stored. For example, this data may include the ephemeris which remains the same for up to two hours, and the almanac which remains the same for several days. The preamble in the TLM word remains the same all the time. The other bits of the TLM word also found in memory remain constant over a long time. On the other hand, the HOW word of each subsequent frame increases by one with a corresponding change in the parity and therefore can be predicted. Even if the ephemeris is obsolete, most of its data bits may remain unchanged over a long time. For example, one of the ephemeris parameters is the semi-major axis parameter, which only undergoes a relatively small change in value. As a result, only the last few of its data bits changes so that most of its other data bits, e.g., first 22 or 21 bits, may be used for periods longer than two hours. Therefore, most of the future navigation data bits can be predicted.

Once predicted or known, the data can be used to remove the data modulation in the received signal. Thus the received signal with the data modulation removed can be integrated for a duration extending over a length of several data bits. Under some circumstances the data may not be known or predicted only over a limited range. In such cases a coherent integration over the length of the known or predicted data bits with additional non data assisted coherent integration beyond the known or predicted data bits may be carried out. This integration results in a mixed data assisted and non data assisted (DA/NDA) integration mode.

FIG. 2 shows a typical stand-alone GPS receiver 205 in which the data memory 204, which stores the predicted data is shown separately for illustration purpose. The GPS signal 202 transmitted from a typical GPS satellite 201 is modulated with navigation data. The receiver 203 correlates the received signal using the predicted or stored data bits. The stored data bits can come from previous navigation data demodulation. For example, the data bits for the ephemeris and the almanac can come from previous data demodulation. The receiver 205 can also obtain the data by demodulation of a strong received signal in another channel. Thus the strong signal can aid the weak signal integration. In cases were predicted or demodulated data is not available, the receiver may integrate in non data assisted (NDA) mode based on non coherent integration. When there is no prior data assisted integration, the bit edge may not be determined, in which case integration over 20 milliseconds and non data assisted coherent integration are not possible, and non-coherent integration is used.

A mixed DA/NDA integration is used when only some of the consecutive data bits are known or predicted and this mode may require both data assisted and non data assisted integrations which can be carried out in two steps shown as 301 in FIG. 3. The first step 302 involves data assisted (DA) integration over the length of the known data bits and terminating the integration if the integrated power exceeds a predefined threshold $Th_1$, in which case the signal acquisition or tracking is declared successful. If the integrated power does not exceed the threshold $T_1$ at the end of the known data bits, then a mixed integration consisting of the prior integration with additional integration over a length of at most one data bit 303 is carried out. The resulting integrated power is tested against another threshold $Th_2$. This non data assisted integration may be coherent with an optimal estimation or maximum likelihood algorithm used to determine the unknown data bit polarity or the integration may be non-coherent. An example of a maximum likelihood algorithm that may be used is the Viterbi algorithm. To determine the unknown data bit polarity, the optimal estimation or maximum likelihood algorithm determines a bit pattern with maximum total power from various possible bit patterns. This bit pattern is deemed to be the correct bit pattern. For example, if the known or predicted bits are 10010, then the total power with one more additional unknown bit may be computed for both possible polarities of the unknown bit in which case the bit patterns are 100101 and 100100. The bit pattern resulting in the highest total integrated power is deemed to be correct. For the next stage, the possible bit patterns would be 10010+00, 01, 10, or 11, as so forth. As in the earlier case this integration is stopped if the integrated power exceeds the next threshold $Th_2$. Otherwise the non data assisted or data assisted integration is continued in stages until the integrated power exceeds the corresponding threshold $Th_N$ for the Nth stage shown as 304.

All of the predefined thresholds may be estimated through training trials and are different for optimal estimation or maximum likelihood coherent integration and non-coherent integrations.

The mixed DA/NDA integration is not limited to only DA integration at the beginning. The mixed DA/NDA may comprise DA followed by NDA which in turn is followed by DA and so on. In this case, each DA stage may extend over a length of consecutively known or predicted bits while each NDA may span one bit. It is also possible for the mixed integration to begin with NDA followed by DA and so on. Thus, the mixed integration is not limited to a particular ordering of DA and NDA stages.

During the data assisted integration the known data bits may constitute a complete word of 30 navigation bits or multiple words or multiple words and a fraction of the last word. When using the complete words, the associated data has to be checked for correctness using the parity bits. This parity check is done by computing the parity based on the bits of the word and previous word bits. In the case where the parity is not matching, the corresponding data word is not used. Further, in the case of very weak signals the parity check alone may not be sufficient and data integrity check may used as an additional integrity check. The integrity check may be done by comparing the value represented by part of the word with a previous value of the same data item. For example if the incomplete data word represents, for example, major axis of the satellite orbit, then this part of the word is compared with a previous value of the major axis. If the difference is within a given limit, then the data is used in data assisted integration. If there is a large difference, then the data is not correct and therefore not used. In some cases the historic value may be available and the data word or part of it may be predicted. In some cases the data under consideration may exhibit some periodic changes and this variation should be taken into account when two different time stamped data words are compared for correctness.

In some cases the correctness of the set of data bits may not be known. In such cases, a data assisted integration based on these data bits in one of the channels and non data assisted integration in another channel for the same data are carried out. The correctness of the data bits may be determined based on the power levels of the above two kinds of integrations. For example, if all of the bits are correct, then the total power for data assisted integration will always be higher than that for non data assisted non-coherent integration over the same length. However if one or more of these data bits is incorrect, then the power for data assisted integration may be less than that for non data assisted integration, indicating that the set of data bits is not correct. For example, suppose a length of data bits are known as 1010101, but it is not clear whether these data bit values are correct. When data assisted coherent integration is carried out the power under each data bit gets added and the final result is the summation under all the data bits. However, if a data bit is wrong then the power corresponding to that bit period of integration gets subtracted and so the total power gets reduced by twice the amount of power under the data bit. However, if non data assisted integration is employed over the same length this reduction is not present and the total power obtained in the non-integration may be more than the data aided mode. This is because there is no power subtraction due to wrong bit polarity assumption.

As mentioned earlier some of the bits in the navigation data never change or change very slowly. The first word of any frame is the TLM word with the preamble remaining the same all the time and the rest of the TLM word changing very rarely. Further, the second word of any data frame is the HOW word, which can be easily predicted by increasing the z-count appropriately and changing the associated parity bits. Thus it is possible to perform data assisted integration over 1.2 seconds at every 6 seconds which is the length of a sub-frame in the GPS message structure. This is in addition to any other data assisted integration within a sub-frame of a navigation message. Thus it is possible to maintain the signal tracking by having a data assisted integration of 1.2 seconds at every 6 seconds. In the case of signal acquisition process the data is usually not known and therefore a data assisted integration is usually not possible. However, when the data is usually known, data assisted integration may be used for most of the time.

In addition to the DA integration, there are some other advantages in predicting or partially decoding the navigation data. Based on these partial navigation data word, the Doppler frequency offset, rate of change of Doppler frequency and code phase offset may be determined with some accuracy and may be used in signal acquisition or reacquisition thus reducing the Time-To-First-Fix or reacquisition time of the receiver.

By wiping off the data modulations in the signal when data bits are known, the remaining data modulations in the carrier can be easily determined. This is because once the data modulations are removed, the carrier phase can be determined accurately and any change in the carrier phase due to data modulation can be easily identified. Thus the data demodulation can be carried out even when the signal is very weak. Then the next succeeding data bits can also be similarly determined. Thus the improvement is compounded. Since the phase of the carrier is accurately determined, the local frequency generator can be more accurately calibrated.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

What is claimed is:

1. A method of acquisition, tracking and reacquisition of weak navigation signals at a receiver, comprising:
   predicting or retrieving navigation data bits; and
   performing integration on a received signal by switching between data assisted, non-data assisted and mixed data assisted/non data assisted modes based on known or predicted data bits of the received signal.

2. The method of claim 1, wherein the known or predicted data bits are predicted, retrieved from receiver memory, or from received signal demodulation.

3. The method of claim 1, wherein a single integration can be mixed with both data assisted and non data assisted integration.

4. The method of claim 3, wherein the mixed data assisted and non data assisted integration comprises:
   removing modulated data from the received signal over a length of known or predicted data bits;
   performing integration on the received signal with the removed data modulation until the integration power exceeds a first threshold; if the power does not exceed the first threshold, then
   continuing to integrate the received signal in the non data assisted mode in stages, wherein a threshold is associated with each stage; and
   terminating the integration at one of the steps if the combined integration power exceeds the threshold for that step.

5. The method of claim 4, wherein an optimal estimation or maximum likelihood algorithm is used in the non data assisted mode.

6. The method of claim 4, wherein the integration in the non data assisted mode continues until all samples are integrated.

7. The method of claim 4, further comprising declaring signal acquisition, signal tracking, or signal reacquisition successful when the combined integration power exceeds the threshold in any of the stages or else declaring a failure.

8. The method of claim 4, wherein the integration is coherent or non-coherent.

9. The method of claim 1, the set of data bits can constitute a complete navigation word or part of the word forming an incomplete word.

10. The method of claim 9, wherein the complete word is used when it passes a parity check and additionally passes a data integrity check.

11. The method of claim 10, wherein the data integrity check involves comparing the complete word with historic or predicted data.

12. The method of claim 10, wherein the data integrity check involves ensuring that a navigation parameter decoded from the word is within a predefined range.

13. The method of claim 10, wherein the data integrity check involves checking for a predetermined variation pattern in the data value of the word.

14. The method of claim 9, wherein the incomplete word is used when it passes a data integrity check.

15. The method of claim 14, wherein the data integrity check involves comparing the incomplete word with historic or predicted data.

16. The method of claim 14, wherein the data integrity check involves ensuring that a navigation parameter decoded from the incomplete word is within a predefined range.

17. The method of claim 14, wherein the data integrity check involves checking for a predetermined variation pattern in the data value of the incomplete word.

18. The method of claim 1, further comprising:
using multi-channels to ensure that the data bits are error free comprising,
integrating received signals in separate channels for the same sample set, wherein the integration in one of the channels is data assisted and the integration in the other channel is non data assisted; and
determining the correctness of the data bits based on the integration powers for the data assisted and non data assisted integrations.

19. The method of claim 1, wherein a continuous data assisted integration is performed for a duration of 1.2 seconds at every six seconds based on predictable TLM and HOW words.

20. The method of claim 1, wherein data assisted integration is more preferred during tracking.

21. The method of claim 1, wherein the start time of integration is selected such that a maximum possible available bits are used in data assisted integration.

22. The method of claim 1, further comprising using partially demodulated or predicted navigation data to predict the Doppler frequency offset, rate of change of Doppler frequency, and PN code phase offset, all of which are used to improve the Time-To-First-Fix of the receiver.

23. The method of claim 1, further comprising using partially demodulated or predicted navigation data to improve data decoding sensitivity.

24. The method of claim 23, wherein the improvement in sensitivity is compounded.

25. The method of claim 1, further comprising using data assisted mode for tracking under a weak signal environment to calibrate a local frequency generator and other baseband parameters.

26. A receiver for acquiring, tracking and reacquiring navigation satellite signals, comprising:
a radio frequency front-end for receiving satellite signals;
a baseband section for processing a received signal into correlation values; and
a processor coupled to the baseband section, wherein the processor predicts or retrieves navigation data bits, and performs integration on the received signal by switching between data assisted, non-data assisted and mixed data assisted/non data assisted modes based on known or predicted data bits of the received signal.

27. The receiver of claim 26, wherein the known or predicted data bits are predicted, retrieved from receiver memory, or from received signal demodulation.

28. The receiver of claim 26, wherein the processor is capable of performing a single integration mixed with both data assisted and non data assisted integration.

29. The receiver of claim 28, wherein the processor performs mixed data assisted and non data assisted integration by removing modulated data from the received signal over a length of known or predicted data bits, performing integration on the received signal with the removed data modulation until the integration power exceeds a first threshold, and if the power does not exceed the first threshold, then continuing to integrate the received signal in the non data assisted mode in stages, wherein a threshold is associated with each stage, and terminating the integration at one of the steps if the combined integration power exceeds the threshold for that step.

30. The receiver of claim 29, wherein the processor uses an optimal estimation or maximum likelihood algorithm in the non data assisted mode.

31. The receiver of claim 29, wherein the processor performs the integration in the non data assisted mode until all samples are integrated.

32. The receiver of claim 29, wherein the processor declares signal acquisition, signal tracking, or signal reacquisition successful when the combined integration power exceeds the threshold in any of the stages or else declares a failure.

33. The receiver of claim 29, wherein the integration is coherent or non-coherent.

34. The receiver of claim 26, the set of data bits can constitute a complete navigation word or part of the word forming an incomplete word.

35. The receiver of claim 34, wherein the processor uses the complete word when it passes a parity check and additionally passes a data integrity check.

36. The receiver of claim 35, wherein the data integrity check involves comparing the complete word with historic or predicted data.

37. The receiver of claim 35, wherein the data integrity check involves ensuring that a navigation parameter decoded from the word is within a predefined range.

38. The receiver of claim 35, wherein the data integrity check involves checking for a predetermined variation pattern in the data value of the word.

39. The method of claim 34, wherein the processor uses the incomplete word when it passes a data integrity check.

40. The receiver of claim 39, wherein the data integrity check involves comparing the incomplete word with historic or predicted data.

41. The receiver of claim 39, wherein the data integrity check involves ensuring that a navigation parameter decoded from the incomplete word is within a predefined range.

42. The receiver of claim 39, wherein the data integrity check involves checking for a predetermined variation pattern in the data value of the incomplete word.

43. The receiver of claim 26, further comprising multiple channels in the baseband section, and wherein the processor integrates received signals in separate channels for the same sample set, wherein the integration in one of the channels is data assisted and the integration in the other channel is non data assisted, and determines the correctness of the data bits based on the integration powers for the data assisted and non data assisted integrations.

44. The receiver of claim 26, wherein the processor performs a continuous data assisted integration for a duration of 1.2 seconds at every six seconds based on predictable TLM and HOW words.

45. The receiver of claim 26, wherein data assisted integration is preferred during tracking.

46. The receiver of claim 26, wherein the start time of integration is selected such that a maximum possible available bits are used in data assisted integration.

47. The receiver of claim 26, wherein the processor uses partially demodulated or predicted navigation data to predict the Doppler frequency offset, rate of change of Doppler frequency, and PN code phase offset, all of which are used to improve the Time-To-First-Fix of the receiver.

48. The receiver of claim 26, wherein the processor uses partially demodulated or predicted navigation data to improve data decoding sensitivity.

49. The receiver of claim 48, wherein the improvement in sensitivity is compounded.

50. The receiver of claim 26, wherein the processor uses data assisted mode for tracking under a weak signal environment to calibrate a local frequency generator and other baseband parameters.

* * * * *

UNITED STATES PATENT AND TRADEMARK OFFICE
CERTIFICATE OF CORRECTION

PATENT NO. : 7,859,456 B2
APPLICATION NO. : 11/548204
DATED : December 28, 2010
INVENTOR(S) : Wang et al.

Page 1 of 1

It is certified that error appears in the above-identified patent and that said Letters Patent is hereby corrected as shown below:

In Column 2, Line 54, delete "frames," and insert -- frames. --, therefor.

In Column 5, Line 61, delete "$T_1$" and insert -- $Th_1$ --, therefor.

In Column 8, Line 41, in Claim 9, delete "claim 1," and insert -- claim 1, wherein --, therefor.

In Column 10, Line 8, in Claim 34, delete "claim 26," and insert -- claim 26, wherein --, therefor.

Signed and Sealed this
Nineteenth Day of March, 2013

Teresa Stanek Rea
*Acting Director of the United States Patent and Trademark Office*